United States Patent
Justin et al.

(10) Patent No.: US 10,623,240 B2
(45) Date of Patent: Apr. 14, 2020

(54) IOT SOLUTION SIZING

(71) Applicant: INTEL CORPORATION, Santa Clara, CA (US)

(72) Inventors: Jerin C. Justin, San Jose, CA (US); Kumar Balasubramanian, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 15/638,769

(22) Filed: Jun. 30, 2017

(65) Prior Publication Data

US 2018/0062919 A1 Mar. 1, 2018

Related U.S. Application Data

(60) Provisional application No. 62/379,324, filed on Aug. 25, 2016.

(51) Int. Cl.
| | |
|---|---|
| *H04L 29/06* | (2006.01) |
| *H04L 29/08* | (2006.01) |
| *G06F 15/173* | (2006.01) |
| *H04L 12/24* | (2006.01) |
| *H04L 12/26* | (2006.01) |
| *H04W 4/70* | (2018.01) |
| *H04W 4/38* | (2018.01) |

(52) U.S. Cl.
CPC .......... *H04L 41/0803* (2013.01); *H04L 43/08* (2013.01); *H04L 43/087* (2013.01); *H04L 43/0864* (2013.01); *H04L 67/22* (2013.01); *H04W 4/38* (2018.02); *H04W 4/70* (2018.02)

(58) Field of Classification Search
CPC ............... H04L 43/0864; H04L 43/087; H04L 41/0803
USPC .......................... 709/220, 223, 224, 238, 243
See application file for complete search history.

(56) References Cited

U.S. PATENT DOCUMENTS

| | | | | |
|---|---|---|---|---|
| 10,083,055 | B2 * | 9/2018 | Gupta | ................. H04L 61/6022 |
| 2008/0098260 | A1 | 4/2008 | Okawa et al. | |
| 2008/0239972 | A1 * | 10/2008 | Omar | .................. H04L 41/5009 370/250 |
| 2012/0266176 | A1 | 11/2012 | Vojnovic et al. | |
| 2013/0159548 | A1 * | 6/2013 | Vasseur | ................. H04L 45/125 709/239 |

(Continued)

FOREIGN PATENT DOCUMENTS

WO 2010045971 A1 4/2010

OTHER PUBLICATIONS

"Understanding the Internet of Things"—GSM Association, Jul. 2014 https://www.gsma.com/iot/wp-content/uploads/2014/08/cl_iot_wp_07_14.pdf (Year: 2014).*

(Continued)

*Primary Examiner* — Randy A Scott
(74) *Attorney, Agent, or Firm* — International IP Law Group, P.L.L.C

(57) ABSTRACT

The techniques disclosed herein include a computing device for Internet of Things (IoT) solution sizing. The computing device is to determine a solution deployment metric, trigger edge traffic, monitor a round trip characteristic and an actuation pattern, execute permutations of input workloads, and determine a solution deployment.

30 Claims, 7 Drawing Sheets

(56) References Cited

U.S. PATENT DOCUMENTS

| | | | |
|---|---|---|---|
| 2015/0358391 A1* | 12/2015 | Moon | H04L 67/10 |
| | | | 709/224 |
| 2015/0365291 A1 | 12/2015 | Burton et al. | |
| 2016/0065653 A1* | 3/2016 | Chen | H04L 67/10 |
| | | | 715/735 |
| 2017/0207948 A1* | 7/2017 | Ratakonda | H04L 41/064 |
| 2017/0238346 A1* | 8/2017 | Egner | H04W 4/029 |
| | | | 370/338 |
| 2018/0070404 A1* | 3/2018 | Giguet | H04W 72/1257 |

OTHER PUBLICATIONS

PCT International Search Report, PCT Application No. PCT/US2017/043626, dated Nov. 2, 2017, 3 pages.

* cited by examiner

IOT SOLUTION SIZING

CROSS-REFERENCE TO RELATED APPLICATION

The present application claims the benefit of the filing date of U.S. Provisional Patent Application No. 62/379,324, filed Aug. 25, 2016, which is incorporated herein by reference.

TECHNICAL FIELD

The present techniques relate generally to Internet of Things (IoT) devices. More specifically, the present techniques relate to solution sizing of the infrastructure architecture of an IoT edge system.

BACKGROUND

One view of the internet is the connection of clients, such as personal computers, tablets, smart phones, servers, digital photo-frames, and many other types of devices to publicly-accessible data-centers hosted in server farms. However, this picture represents a small portion of the overall usage of the globally-connected network. A very large number of connected resources currently exist, but are not publicly accessible. Examples include corporate networks, private organizational control and monitoring networks spanning the globe, and peer to peer relays designed for anonymity.

The Internet of Things (IoT) may bring Internet connectivity to about 50 billion devices by 2020. For organizations, IoT devices may provide opportunities for monitoring, tracking, or controlling other devices and items, including further IoT devices, other home and industrial devices, items in manufacturing and food production chains, and the like. Further, the emergence of IoT networks has served as a catalyst for profound change in the evolution of the internet. In the future, the internet is likely to evolve from a primarily human-oriented utility to an infrastructure where humans may eventually be minority actors in an interconnected world of devices.

In this view, the internet will become a communications system for devices, and networks of devices, to not only communicate with data centers, but with each other. The devices may form functional networks to perform functions, which may dissolve once the function is performed. Challenges exist in enabling reliable, secure, and identifiable devices that can form networks as needed to accomplish tasks.

DESCRIPTION OF THE EMBODIMENTS

Workloads at the edge of an IoT system may be characterized by transport protocols, sensor receive and actuation characteristics, input/output (I/O) channels, and configuration and management overheads. These characteristics are interdependent, resulting in significant complexities in solution sizing and suboptimal solution offerings.

Embodiments disclosed herein relate to the field of IoT data propagation and analysis, with particular reference to IoT end points and their associated aggregate devices in the context of end-to-end solution characterization. Real-world user workloads at the edge constitute transport protocols, sensor receive and actuation characteristics, and I/O channels among other data. Configuration and management tools that attempt to address the inter-dependencies of this data encounter significant solution sizing complexities resulting in suboptimal solution offerings. Additionally, what-if permutations may add cost and slow time to market making it sometimes impractical to adopt the configuration and management tools for real-world deployments. Solution providers may therefore resort to evaluations of solution characteristics by linear extrapolations, which can fail to adequately represent real-world measurements.

The proposed improvement or optimization of IoT edge system infrastructures may provide interfaces and procedures for sensors, simulators, and system models that facilitate improved or optimal IoT solution sizing for a defined set of workflows. Embodiments result in the infrastructure that determines an improved or optimal IoT solution impact of one or more input parameters.

Figure 1:
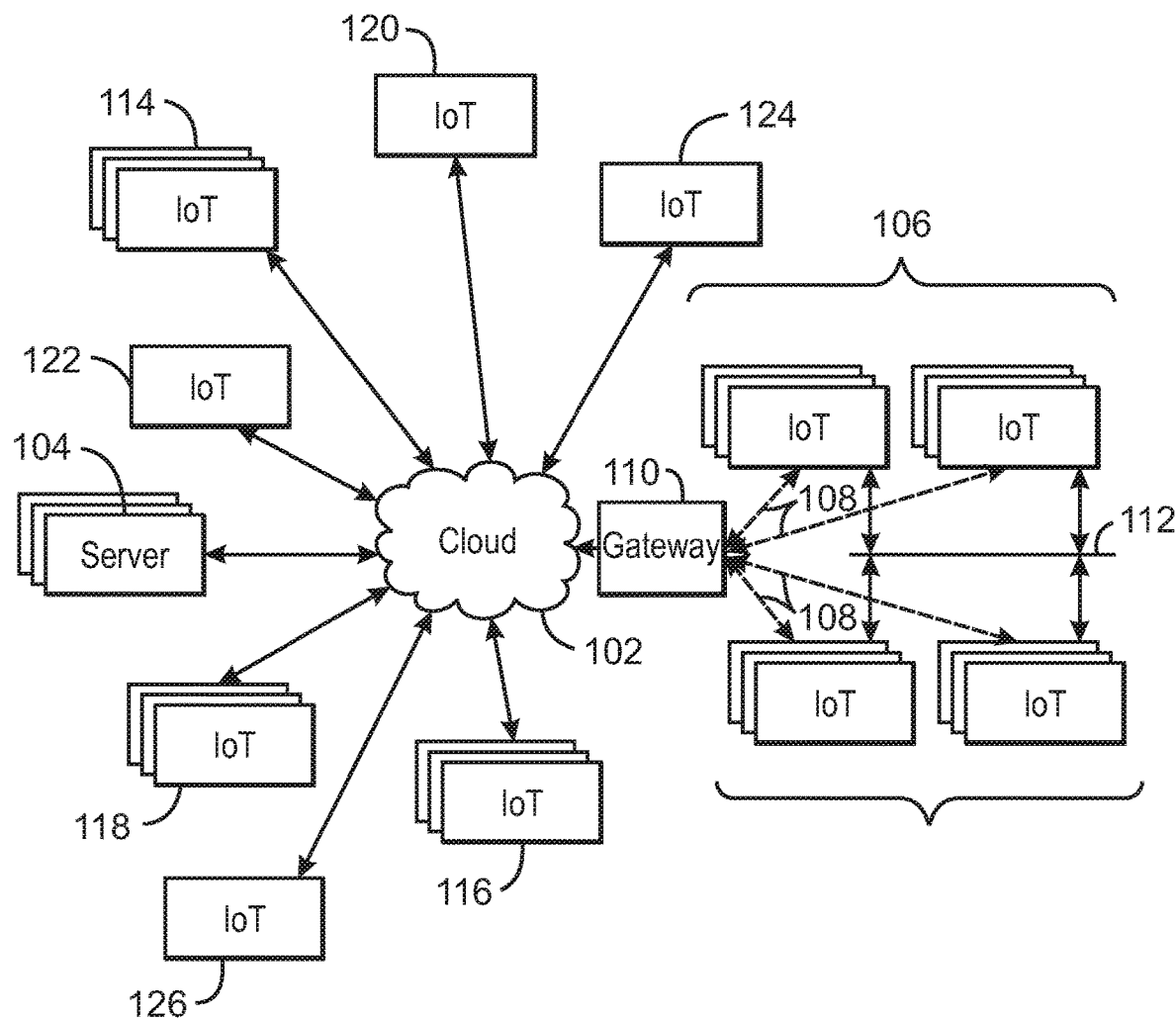
FIG. 1 is a drawing of a cloud computing network, or cloud, in communication with a number of Internet of Things (IoT) devices in accordance with embodiments of the present techniques.

FIG. 1 is a drawing 100 of a cloud computing network, or cloud 102, in communication with a number of Internet of Things (IoT) devices. The cloud 102 may represent the Internet, or may be a local area network (LAN), or a wide area network (WAN), such as a proprietary network for a company. The IoT devices may include any number of different types of devices, grouped in various combinations. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 102 through wireless links 108, such as low-power wide area (LPWA) links, and the like. Further, a wired or wireless sub-network 112 may allow the IoT devices to communicate with each other, such as through a local area network, wireless local area network, and the like. The IoT devices may use another device, such as a gateway 110 to communicate with the cloud 102. In some examples, the sub-network 112 may couple one or more of the IoT devices to the gateway 110 using a wired network.

Moreover, the IoT devices may also use one or more servers (not shown) operationally disposed along the gateway 110, or between the group 106 and the gateway 110, to facilitate communication of the group 106 with the cloud 102 or with the gateway 110. For example, the one or more servers may operate as an intermediate network node to support a local edge cloud or fog implementation among a local area network.

The network topology may include various types of IoT networks, such as a mesh network via Bluetooth® low energy (BLE) links. Other types of IoT networks may include a wireless local area network (WLAN) to communicate with IoT devices through IEEE 802.11 (Wi-Fi®) links, a cellular network to communicate with IoT devices through an LTE/LTE-A (4G) or 5G cellular network, and a LPWA network. A LPWA network may be compatible with the long range wide area network (LoRaWAN™) specification promulgated by the LoRa alliance. The network topology or IoT network(s) may include IPv6 over Low Power Wide-Area Networks (LPWANs) compatible with a specification promulgated by the Internet Engineering Task Force (IETF). Further, the respective IoT networks may communicate with an outside network provider (e.g., a tier 2 or tier 3 provider) via a variety of communications links, such as an LTE cellular link, an LPWA link, or a link based on the IEEE 802.15.4 standard, such as Zigbee®, and so on. The respective IoT networks may also operate by network and internet application protocols such as Constrained Application Protocol (CoAP). The respective IoT networks may also be integrated with coordinator devices that provide a chain of links that forms cluster tree of linked devices and networks.

Although wireless networks and wired networks are described, such as LPWA links, optical links, and the like, it may be noted that any type of network may be used to couple the devices to each other or to a gateway 110. A network or assembled group of devices may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support to what is disclosed herein. Thus, any link 108 or network 112 may utilize a wired connection or a wireless connection. Further, IoT devices may be in direct communications with other devices in the cloud 102 without the use of a gateway 110. The backbone links 108 may include various wired or wireless technologies, including optical networks and, again, may be part of a LAN, a WAN, or the Internet. Additionally, such communication links facilitate optical signal paths among both IoT devices with the cloud 102 and the gateway(s) 110, including the use of MUXing/deMUXing components that facilitate interconnection of the various devices.

IoT devices may include temperature sensors, remote weather stations 114, local information terminals 116, alarm systems 118, automated teller machines 120, alarm panels 122, or moving vehicles, such as emergency vehicles 124 or drones 126, among many others. Each of these IoT devices may be in communication with other IoT devices, with servers 104, or both.

As can be seen from FIG. 1, a large number of IoT devices may be communicating through the cloud 102. This may allow different IoT devices to request or provide information to other devices autonomously. For example, the traffic control group 106 may request a current weather forecast from a group of remote weather stations 114, which may provide the forecast without human intervention. Further, an emergency vehicle 124 may be alerted by an automated teller machine 120 that a burglary is in progress. As the emergency vehicle 124 proceeds towards the automated teller machine 120, it may access the traffic control group 106 to request clearance to the location, for example, by lights turning red to block cross traffic at an intersection in sufficient time for the emergency vehicle 124 to have unimpeded access to the intersection.

Furthermore, components shown in FIG. 1, such as the gateway and various sensors or servers, may be real, virtual, or simulated. Indeed, the components depicted in FIG. 1 may be real or simulated and may be used in the hybrid operation of the live IoT components with simulated or emulated components. Moreover, clusters of IoT devices, such as the remote weather stations 114 or the traffic control group 106, may be equipped to communicate with other IoT devices as well as with the cloud 102. This may allow the IoT devices to form an ad-hoc network or virtual network between the devices, allowing them to function as a single device, which may be termed a fog device. This is discussed further with respect to FIG. 2.

IoT solution sizing may be used to determine the number of devices needed for a particular situation. For example, if a traffic control group is alerted to inclement weather moving in, IoT solution sizing may ensure that remote weather stations are included in the solution. As a result, the traffic control group may receive weather forecasts from remote weather stations in the area of concern.

Figure 2:
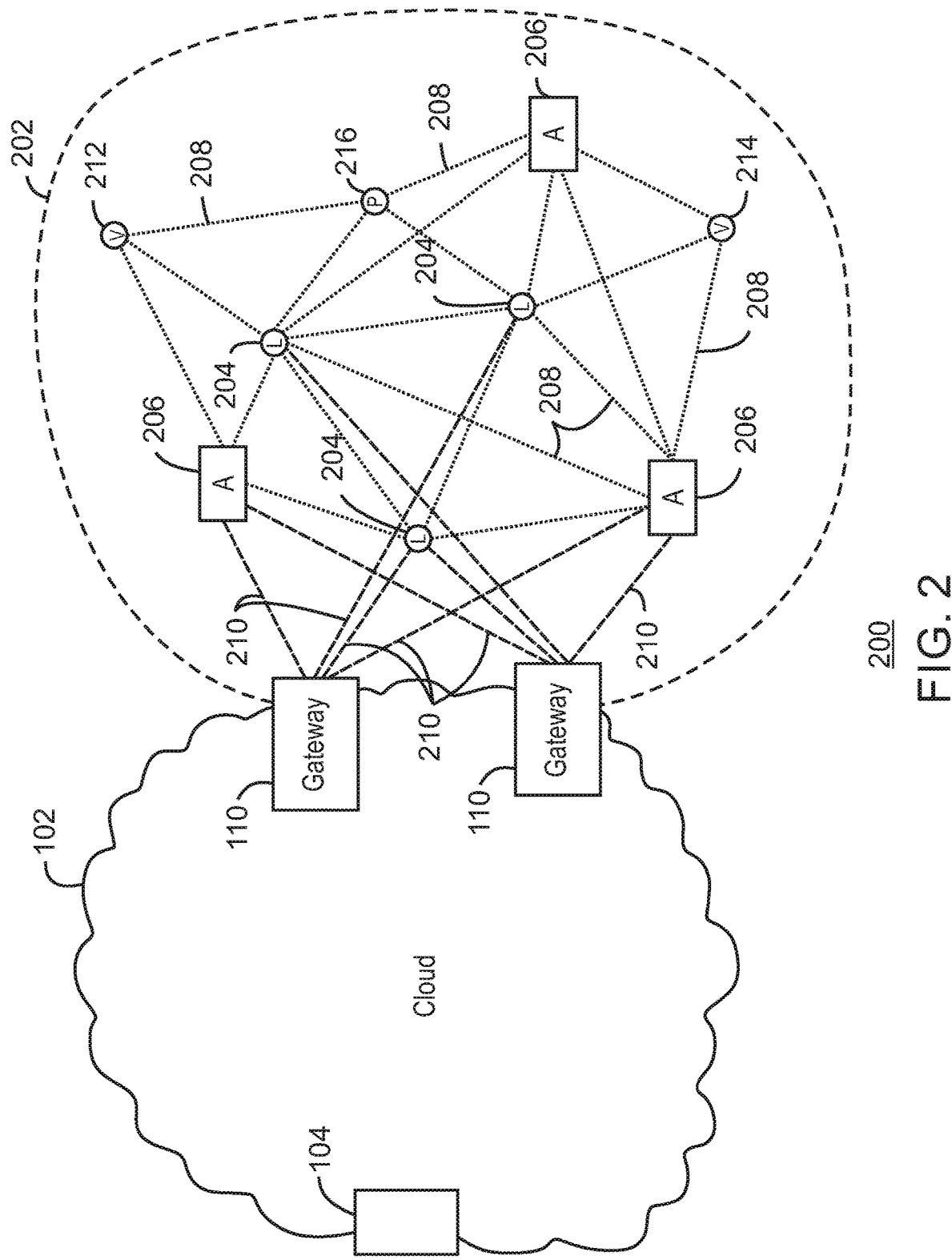
FIG. 2 is a drawing of a cloud computing network, or cloud, in communication with a mesh network of IoT devices, which may be termed a fog, operating at the edge of the cloud in accordance with embodiments of the present techniques.

FIG. 2 is a drawing 200 of a cloud computing network, or cloud 102, in communication with a mesh network of IoT devices, which may be termed a fog 202, operating at the edge of the cloud 102. Like numbered items are as described with respect to FIG. 1. As used herein, a fog device 202 is a cluster of devices that may be grouped to perform a specific function, such as traffic control, weather monitoring, plant control, home monitoring, and the like.

Although the fog device 202 is shown as a mesh network in this example, using gateways 110 to communicate with devices in the cloud 102, the devices do not have to be part of a mesh network, or even proximate to each other to form a fog device. Thus, the devices do not have to be in direct radio or network communications with each other, or proximate to each other, but may form an ad hoc group based on function. The formation of the fog device 202 may be as simple as sharing naming, type, and identification information, for example, group identity credentials, between the different devices forming the fog device. This may allow any device to act as a representative of the fog device 202, with providing identity specific to the device. As an example, although the fog device 202 in this example is shown as being made up of devices in a single location, fog devices can include devices in multiple locations, formed to provide specific services. For example, the fog device 202 may include remote weather stations located in the cloud 102. Further, a server 104 located in a data center may be included in the fog device 102 for data analysis, and other services.

In this example, the fog 202 is a group of IoT devices at an intersection. The fog 202 may be established in accordance with specifications released by the OpenFog Consortium (OFC), among others. These specifications allow the formation of a hierarchy of computing elements between the gateways 110 coupling the fog 202 to the cloud 102 and endpoint devices, such as traffic lights 204 and data aggregators 206 in this example. The fog device 202 can leverage the combined processing and network resources that the collective of IoT devices provides.

Traffic flow through the intersection may be controlled by a plurality of traffic lights 204 (e.g., three traffic lights 204). Analysis of the traffic flow and control schemes may be implemented by aggregators 206 that are in communication with the traffic lights 204 and each other through a mesh network. Data may be uploaded to the cloud 102, and commands received from the cloud 102, through gateways 110 that are in communication with the traffic lights 204 and the aggregators 206 through the mesh network.

Any number of communications links may be used in the fog 202. Shorter-range links 208, for example, compatible with IEEE 802.15.4 may provide local communications between IoT devices that are proximate to the intersection. Longer-range links 210, for example, compatible with LPWA standards, may provide communications between the IoT devices and the gateways 110. To simplify the diagram, not every communications link 208 or 210 is labeled with a reference number. Further, not every device that participates in the fog device 202 needs to be located proximate to the other devices or in direct radio communications. For example, the fog device 202 may incorporate a weather station located on a different network.

One or more of the communications links 208 and 210 may be replaced with a wired connection between two devices. The network forming the fog device 202 does not have to be a mesh network, but may be a standard network in which each device is coupled to other devices through a wired or wireless connection to the gateways 110.

The fog 202 may be considered to be an interconnected network wherein a number of IoT devices are in communications with each other, for example, by the communication links 208 and 210, through the cloud 102 via a network communications link, or through a gateway 110. For devices proximate to one another, the network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among many others.

In some aspects, communications from any IoT device may be passed along the most convenient path between any of the IoT devices to reach the gateways 110, for example, the path having the fewest number of intermediate hops, or the highest bandwidth, among others. In these networks, the number of interconnections provides substantial redundancy, allowing communications to be maintained, even with the loss of a number of IoT devices.

In some aspects, the fog device 202 can include temporary IoT devices. In other words, not all of the IoT devices may be permanent members of the fog 202. In the example in the drawing 200, three transient IoT devices have joined the fog 202, a first vehicle 212, a second vehicle 214, and a pedestrian 216. In these cases, the IoT device may be built into the vehicles 212 and 214, or may be an App on a cell phone carried by the pedestrian 216.

The fog 202 of the devices may be presented to clients in the cloud 102, such as the server 104, as a single device located at the edge of the cloud 102. In this example, the control communications to specific resources in the fog 202 may occur without identifying any specific IoT device within the fog 202. Accordingly, if an IoT device fails, other IoT devices may be able to discover and control a resource. For example, the traffic lights 204 may be wired so as to allow any one of the traffic lights 204 to control lights for the other traffic lights 204.

In some examples, the IoT devices may be configured using an imperative programming style, e.g., with each IoT device having a specific function and communication partners. However, the IoT devices forming the fog 202 may be configured in a declarative programming style, allowing the IoT devices to reconfigure their operations and communications, such as to determine needed resources in response to conditions, queries, and device failures. This may be performed as transient IoT devices, such as the pedestrian 216, join the fog 202. As the pedestrian 216 is likely to travel more slowly than the vehicles 212 and 214, the fog 202 may reconfigure itself to ensure that the pedestrian 216 has sufficient time to make it through the intersection. This may be performed by forming a temporary group of the vehicles 212 and 214 and the pedestrian 216 to control the traffic lights 204. If one or both of the vehicles 212 or 214 are autonomous, the temporary group may instruct the vehicles to slow down prior to the traffic lights 204.

As the transient devices 212, 214, and 216, leave the vicinity of the intersection the fog 202, it may reconfigure itself to eliminate those IoT devices from the network. As other transient IoT devices approach the intersection, the fog 202 may reconfigure itself to include those devices.

The fog 202 may include the traffic lights 204 for a number of intersections, such as along a street, along with all of the transient IoT devices along the street. The fog 202 may then divide itself into functional units, such as the traffic lights 204 and other IoT devices proximate to a single intersection.

This type of combination may enable the formation of larger IoT constructs in the fog 202. For example, if an emergency vehicle joins the fog 202, an emergency construct, or virtual device, may be created that includes all of the traffic lights 204 for the street, allowing control of the traffic flow patterns for an entire street. The emergency construct may instruct the traffic lights 204 along the street to stay red for opposing traffic and green for the emergency vehicle, expediting the passage of the emergency vehicle. Lastly, while this discussion may focus on a traffic example, many other applications are relevant and applicable.

IoT solution sizing may involve determining the number of discrete devices needed to implement a solution. In the emergency vehicle example, the number of IoT devices, such as traffic lights 204, vehicles 212 and 214, and the like, for the street may correspond to the number of discrete devices that may be included in the solution to expedite the emergency vehicle's passage.

Certain embodiments provide for an IoT system to perform simulations of the IoT system itself. For instance, simulation code may be stored and executed on the fog device 202, the aggregation device 302 of FIG. 3, or on other devices in an IoT system, such as the data aggregators 206 of the fog device 202. On the other hand, the simulation code may be stored and executed on a server, cloud server, remote computer, desktop computer, and so on. The simulation provides for considering various simulated conditions of the IoT system. In evaluation or operation, the IoT devices of FIG. 2 may be real, virtual, or simulated.

Simulations may include different workloads on the existing IoT architecture giving resulting solution characteristics. In some examples, the simulation system disposed in the IoT system may iterate through simulated incremental values of workload values, architecture or gateway values, and observed solution characteristics values. In particular examples, the simulations may provide for reconfiguration of a fog device 202, for example, by modelling a change in which IoT devices are used to provide particular functions. In other examples, the simulations may provide for IoT solution sizing including consideration of various workloads, sensory devices, and solutions.

Again, as indicated, an IoT simulation system may be installed and executed on an existing fog device 202, existing aggregation device 302, other devices in an existing IoT system, existing server or desktop computer, and so on. The installation of the IoT simulation system may allow for the creation of a virtual IoT device that includes both virtual and real IoT devices. The virtual IoT device may allow for testing different configurations of IoT devices, for example, before adding additional IoT devices to a fog device 202 or reconfiguring communications in a fog device 202. The test results may determine functionality, stability, and the like, as the configuration changes. Further, the IoT system may be monitored and observed in real time and the simulations to provide for IoT solution sizing including consideration of various workloads, sensory devices, and solutions including observed solutions. Indeed, the simulations for evaluating IoT solution sizing may run and operate in an environment where both live IoT systems and the simulation/emulation are running together to consider, for example, an expansion of an IoT system by testing the proposed architecture. Thus, embodiments may include a hybrid of live and simulated/emulated systems. This hybrid set-up may provide an opportunity to test, for example, system capacity and fault recovery scenarios.

Figure 3:
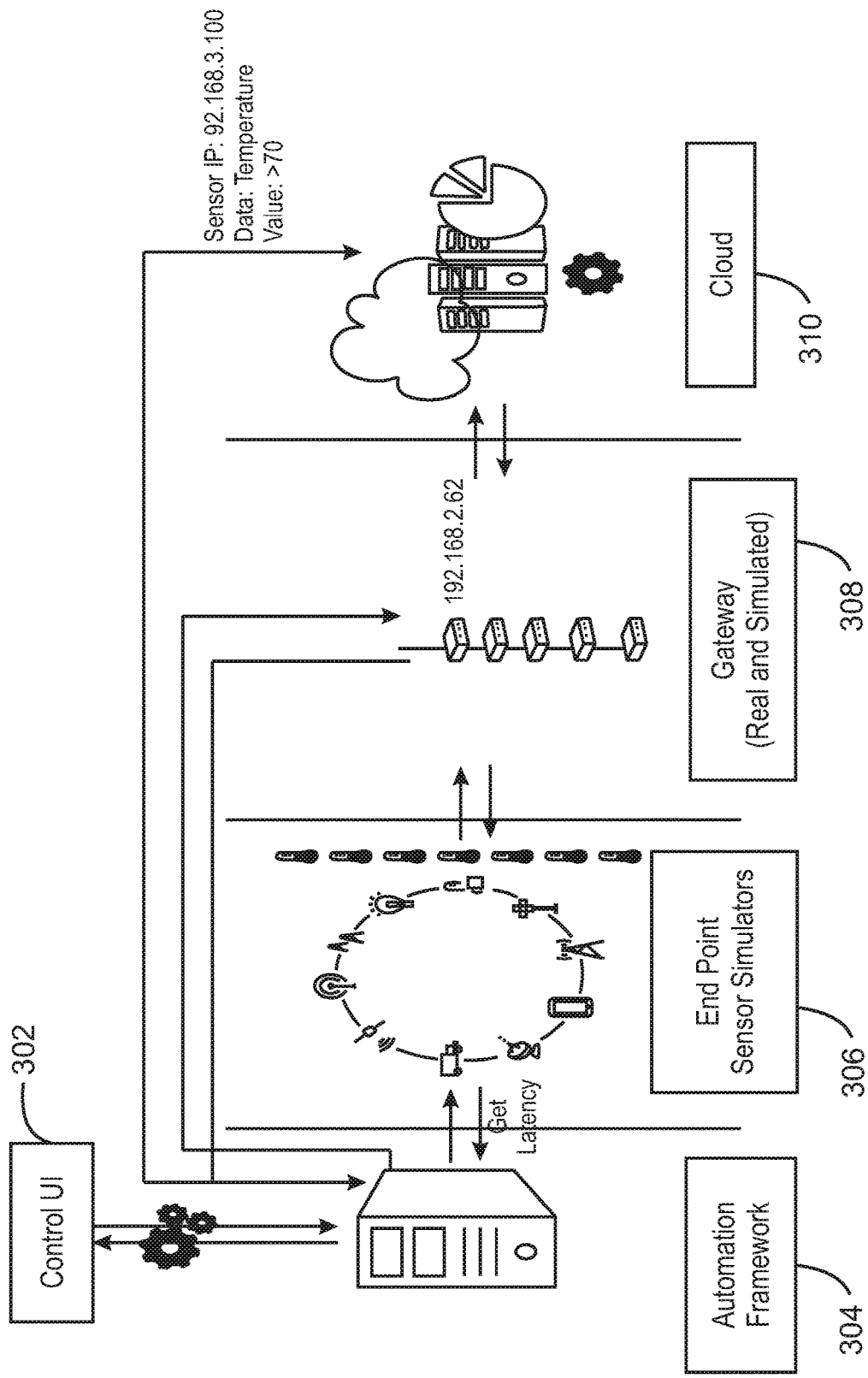
FIG. 3 is a schematic illustration of an end-to-end IoT implementation in accordance with embodiments of the present techniques.

FIG. 3 is a schematic diagram of an IoT system 300 accommodating examples of an end-to-end IoT implementation. Components that facilitate IoT deployments of beneficial or optimal solution size are depicted in FIG. 3. Further, the IoT system may include a hybrid architecture of live components and simulated or emulated components.

The example control user interface (UI) 302 provides several functions as described below. The control UI 302 interacts with an automation framework 304, which is also discussed in more detail below. The system 300 includes end-point sensor simulators 306 and a gateway 308. The gateway 308, or end-point aggregator, collects data from the end-point sensor simulators 306 and the cloud 310. The components 302-310 are interconnected.

The control UI 302 may function as a workflow-input configurator. The control UI 302 may provide access to configuration parameters, such as the number of sensors, sensor publish frequencies, packet sizes, burstiness of the traffic profiles, quality of service (QoS) values of Message Queuing Telemetry Transport (MQTT) based transmissions, and the like. The control UI 302 may facilitate the dynamic addition of a new set of input configuration parameters based on, for example, the needs of the particular use case scenario. A modular design if employed for the control UI 302 may facilitate a sensor, real or simulated, to interface with the application program interface (API) of the control UI 302. Further, the control UI 302 has the ability in some examples to dynamically modify runtime parameters, which may be a potentially beneficial characteristic that may give the edge infrastructure the ability to more accurately represent real world scenarios. In addition to sensor and sensor hub configurations, the control UI 302 in certain examples may also trigger network traffic sources and management events to complete the real-world load points. The traffic profiles may reflect the control packets from neighboring networking devices while management traffic includes Telnet, Secure Shell (SSH), and Hypertext Transfer Protocol (HTTP) transactions.

In some examples, the control UI 302 may also generally function as a real time monitoring interface. For instance, the control UI 302 may employ monitoring daemons. If so, the control UI 302 may initiate its monitoring daemons in devices the control UI 302 controls. These devices may include sensor hubs, sensors, gateways, cloud servers, and the like. In particular examples, the monitoring daemons may be passive and in listening mode, periodically recoding readings within the logging database, and so forth. In certain embodiments, devices within an IoT subsystem may derive their clock source from a network time protocol (NTP) server located within the control UI 302. This may facilitate that time stamped logs are synchronized and can be correlated.

The control UI 302 may further function as an orchestrator that simultaneously or substantially simultaneously controls most or all elements of an IoT system as shown in FIG. 3. For example, the control UI 302 may have the ability to initiate a sensor publish at the end point while at the same time causing a link to flap at the north bound interface of the gateway to the cloud thereby also measuring backpressure and retransmission rates. In some examples, the control UI 302 is capable of controlling various components simultaneously by spawning parallel processes and time synchronizing their start events. These active daemons may result in a capability that facilitates the replication of events and triggers as witnessed in real word scenarios.

Finally, the control UI 302 may function as an event correlator that analyzes impact and root cause failures. As discussed above, the control UI 302 in some embodiments can act as the clock source for most or all sub-blocks of an IoT system. This vantage point may facilitate the control UI 302 to detect failures, perform analyses by executing canned debugging commands, and self-correct identified error conditions. This real time detection and recovery failure may result in enhanced capabilities and availability of associated IoT systems.

An iteration generator may be an automation utility within the control UI 302 that facilitates the choice of configuration values for a plurality of input parameters by the user. The table below gives examples of input parameters and exemplary values of the parameters.

TABLE 1

Example Values of Exemplary Workload Parameters

| Input Workload Parameter | Value |
| --- | --- |
| File Size (MB) | 100, 200, 300, 400, 500 |
| USB Access Time (ms) | 1 |
| USB Interface Throughput (MB/s) | 12, 480, 640 |
| Video Location | Local Disk, USB |
| Wifi Throughput (MB/s) | 100, 1000 |
| CPU Frequency (MGHz) | 1460, 1800 |
| CPU Cores | 0, 1, 2, 4 |
| Sensor Count | 1, 30, 50 |
| FFMPEG Process | True, false |
| Low Priority Process Running Time (ms) | 100, 300 |
| High Priority Process Running Time (ms) | 30, 60 |
| Enable Mosquito Process | True, False |
| RAM Size (GB) | 4, 8, 16, 32 |
| Sensor Data Size (bytes) | 16, 32, 64, 128 |
| Enable Low Priority Process | True, False |
| Enable High Priority Process | True, False |
| Network Interface Throughput (MB/s) | 100, 1000 |

TABLE 1-continued

Example Values of Exemplary Workload Parameters

| Input Workload Parameter | Value |
| --- | --- |
| Enable Sensors | True, False |
| Scheduler Policy | PRIORITY_NON_PREEMTIVE, PRIORITY_PREEMTIVE |

The iteration generator may build all or most permutations of the given input values and trigger a series of automation runs that are executed generally sequentially. This may give the user the ability to state, for example, limiting conditions as the input parameters and facilitates system determination of a beneficial or optimal set of workflow and architectural options identified within the stated boundary conditions.

In particular embodiments, the control UI 302 may interact with a structured query language (SQL) enabled integrated database which may be a component of an edge infrastructure. Configuration of workflow parameters, results logging, binary searches, and pruning based on results from prior runs may be promoted or made possible by the database. In certain examples, because interactions to the database are via the control UI 302, the security and integrity of the stored data may be satisfied.

Workflow configuration information, observed system performance, and the resulting solution characteristics may be mapped in each tuple in the edge infrastructure's database. This correlation generally provides for the building of functions and the extrapolation of solution characteristics and system performance for a range of incrementing workload parameters thus giving the edge architecture the ability to run thousands of what-if permutations. As a result, a beneficial or optimal hardware edge system may be identified for a targeted usage.

In certain embodiments, the automation framework 304 houses a plurality of trigger scripts. The edge infrastructure provides APIs that enable canned trigger scripts to interact. The set of APIs exchange a standard set of timing information that allows the trigger scripts to identify synchronous versus staggered starts. This capability of the edge infrastructure results from the API definitions and timing information and may facilitate the user to generate hundreds of trigger profiles that replicate real world scenarios.

In certain embodiments, a wide array of sensors publish data with varying publish cycles. These data streams and their underlying protocols, e.g., Bluetooth Low Energy (BLE), Zigbee, and Wifi, may create a footprint that is specific to the workload generated. In some examples, this correlation between workloads and the utilization footprints can be quantitatively measured on an IoT gateway and is referred to as a utilization map. Utilization maps may be employed by solution providers when planning for various complex deployment scenarios. A benefit of utilization maps is that they provide the quantitative predictors of end-to-end performance for the intended deployment.

The usefulness of the correlation between a system utilization map and associated workload is determined by the accuracy of the workloads as compared to their real world deployments. The cost of accurate representation of real devices at the edge iterating through various permutations while at the same time building utilization maps on the IoT aggregation device may be impractical. For example, a sequence of 50 input workload parameters yields approximately 11 million permutations. Examples of input workload parameters and their values are given in the table below.

In embodiments, relatively large numbers of execution permutations are made possible by a suite of observability tools. These tools map the workflow iterations, the system's correlating utilization metric, and the predicted behavior of the system in a relational database. Various real world iterations are carried out to calibrate and build accurate functions that produce the expected utilization metrics for various inputs. The nature of the edge architecture facilitates the integration of workload modules that may include sensor simulation modules and other modules. The quantification of most or all elements of an edge architecture may facilitate the what-if iterative generation of large sets of workload permutations and the analysis and evaluation of beneficial or optimal utilization characteristics.

Thus, embodiments can build a modular engine or model (and/or utilize an existing engine) to model workflow directed to various end points and new conditions. Execution time on a mainframe can reach 100 years (not feasible) for 30 parameters, for example. Advantageously, execution time may be reduced via pruning to give, for example, an execution time of weeks or less. For instance, if a model permutation for a memory condition is changed from 4 GB to 8 GB, and the effect is insignificant, then the 16 GB and 32 GB cases need not be evaluated, i.e. are pruned. This model technique (as described more with respect to FIG. 4) may be implemented on an aggregation device or on a remote computing device, or other computing system. Indeed, embodiments may be extended from the aggregation device or gateway to other computing devices (remote or local) with a processor and memory to run the permutations or iterations.

Figure 4:
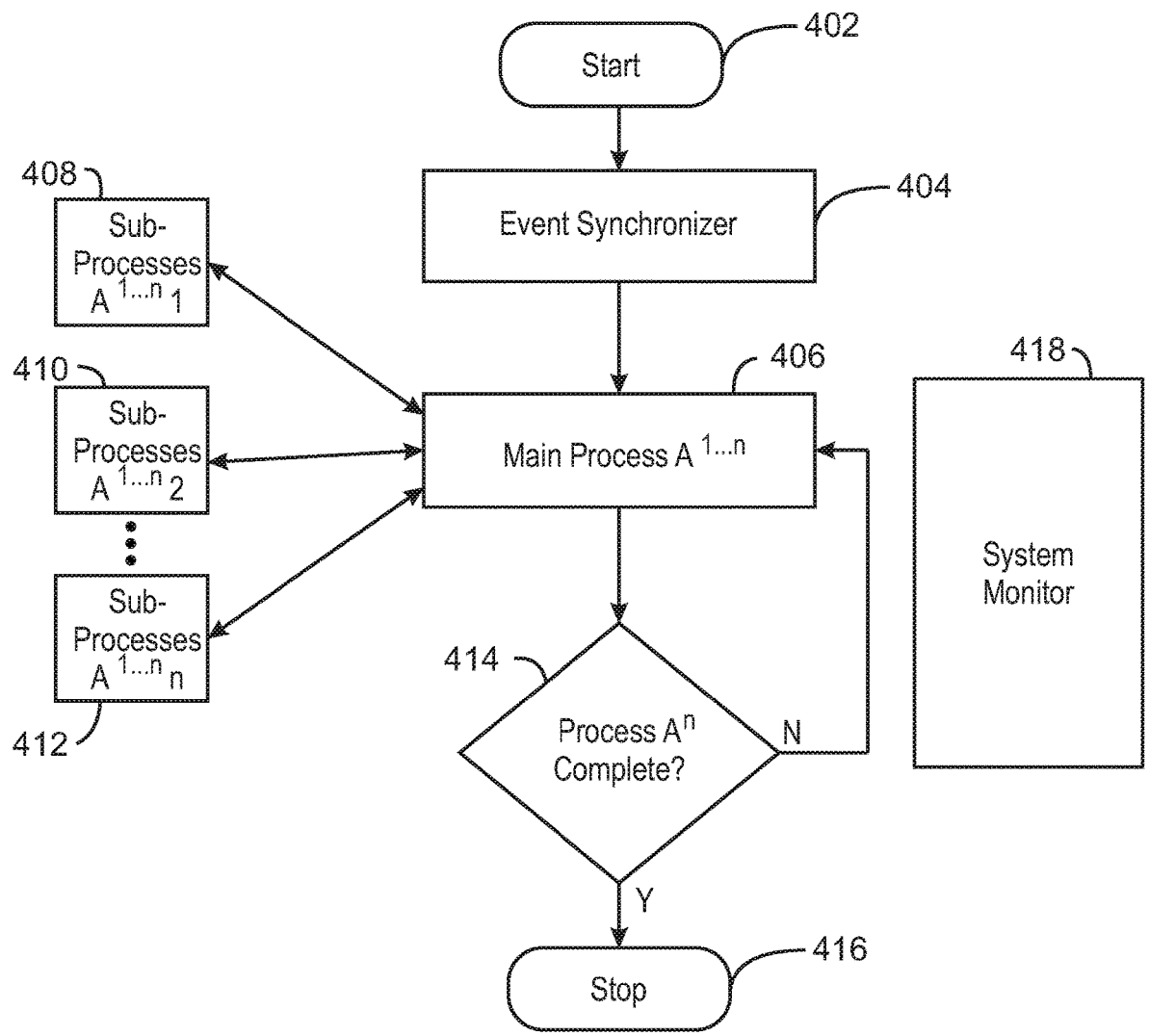
FIG. 4 is a flowchart of a method for identifying the optimal IoT solution impact of one or more input parameters in accordance with embodiments of the present techniques.

FIG. 4 is a method 400 for solution sizing for an IoT system. FIG. 4 is a schematic diagram of the use of a simulation or model for identifying a beneficial or optimal IoT solution impact of one or more input parameters. At block 402, the method starts. The model may implement triggers and perform end point simulations. An event synchronizer 404 reviews events in the simulation and provides feedback. The event synchronizer 404 may be similar to or a type of a control UI. The event synchronizer 404 generally monitors gateways, and coordinates and measures gateway characteristics and impact (e.g., percent CPU on gateway latency).

The simulation evaluates different workflows, as indicated by blocks 406-412, such as changing sensor input from 1 to 30 for one iteration. In certain analyses, the main processes 406 may be characterized as master and the permutations of sub-processes 408-412 as slaves. The implementation may include a system monitor 418. For example, the technique may set up daemons to collect solution (observed) characteristics from the gateway while the workflow is being executed. When less than n main evaluation processes are complete, the current implementation of the method or technique may continue, as indicated at block 414. When n main evaluation processes are complete, the method or technique may stop, as indicated by block 414 and reference numeral 416.

Figure 5:
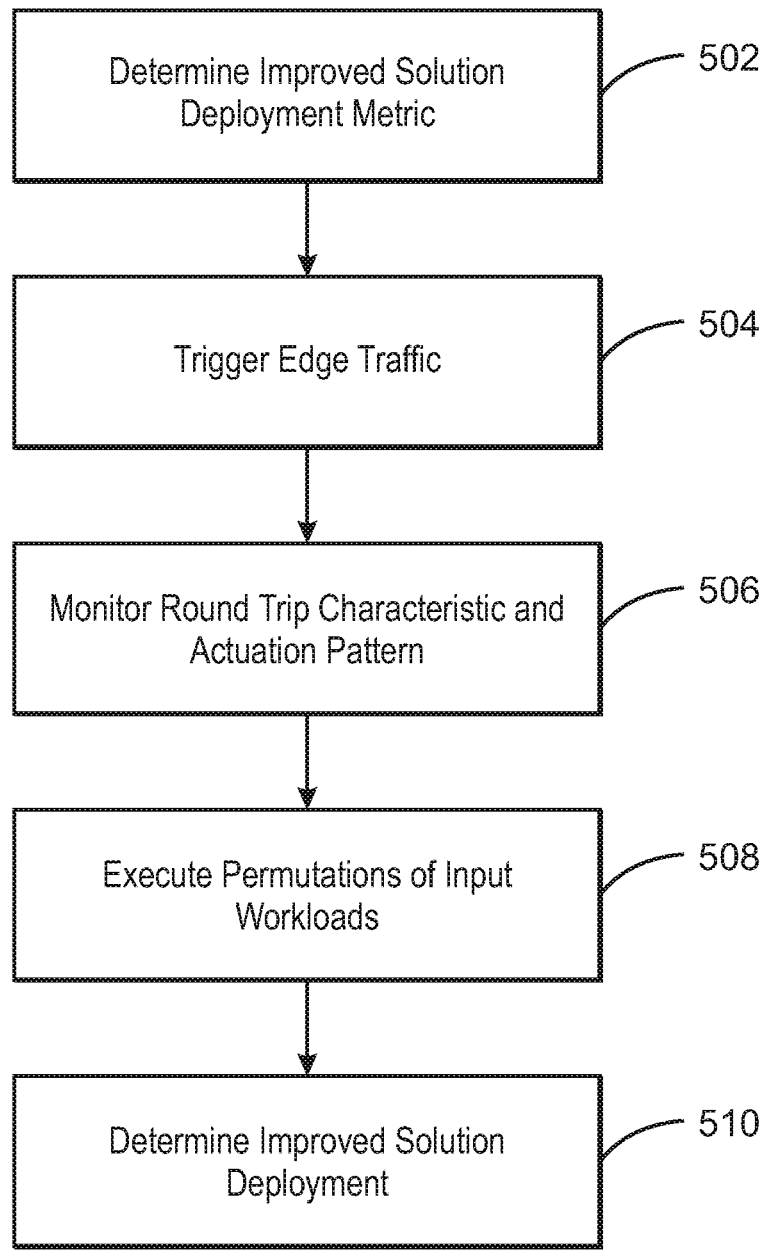
FIG. 5 is a flowchart of a method for IoT solution sizing in accordance with embodiments of the present techniques.

FIG. 5 is a flowchart of a method 500 for IoT solution sizing. At block 502, an improved or optimal solution deployment metric is determined. This may be accomplished by evaluating the characteristic impact of a plurality of workflows. The solution deployment metric may be percent central processing unit (CPU), percent memory, link quality, signal level, or time-to-transmit. The percent CPU can be the percentage of CPU used by the system or process.

The percent memory can be the percentage of random access memory (RAM) used by the system or process. The link quality or quality link can be an indication of how well the reception occurred, such as the percentage of correctly received packets. The signal level or level of signal can be an indication of the strength of the signal. Lastly, the time to transmit can be the time taken to transmit, for example, a complete file.

At block 504, edge traffic is triggered. The triggering of edge traffic may refer to the control UI sending traffic start notifications to sensors or sensor simulators along with the appropriate configuration parameters, such as publish frequency, QoS values, and payload size. At block 506, round trip characteristics and actuation patterns are monitored. For example, latency measurements may start when a sensor sends data to a gateway and the data is forwarded to the cloud. An end-to-end round trip may occur when the data is returned to the actuation device attached to the sensor via the gateway. Monitoring may be completed from the sensors to the end devices.

At block 508, permutations of input workloads are executed. The permutations may be executed, for example, by a plurality of trigger scripts housed in the automation framework. In some examples, a trigger script may run a function automatically in response to a certain occurrence or supporting event. These permutations may refer to the various combinations that constitute workload configurations. For example, a workload run may refer to a publish frequency of one per second, with standard packet sizes of 64, 128, 256, 512, 1025, and 1580, and communication systems WiFi and BLE. An exhaustive set of permutations may include every combination possible with the above set of parameters.

At block 510, an improved or optimal solution deployment is determined. Parameter values that exceed defined solution characteristic thresholds, e.g., computer/memory usage, may be removed from the set of improved or optimal values. This process may continue until all possible permutations are considered. Upon completion, the system may provide an improved or optimal set of configuration values suitable for the deployment based on the defined set of solution constraints.

Figure 6:
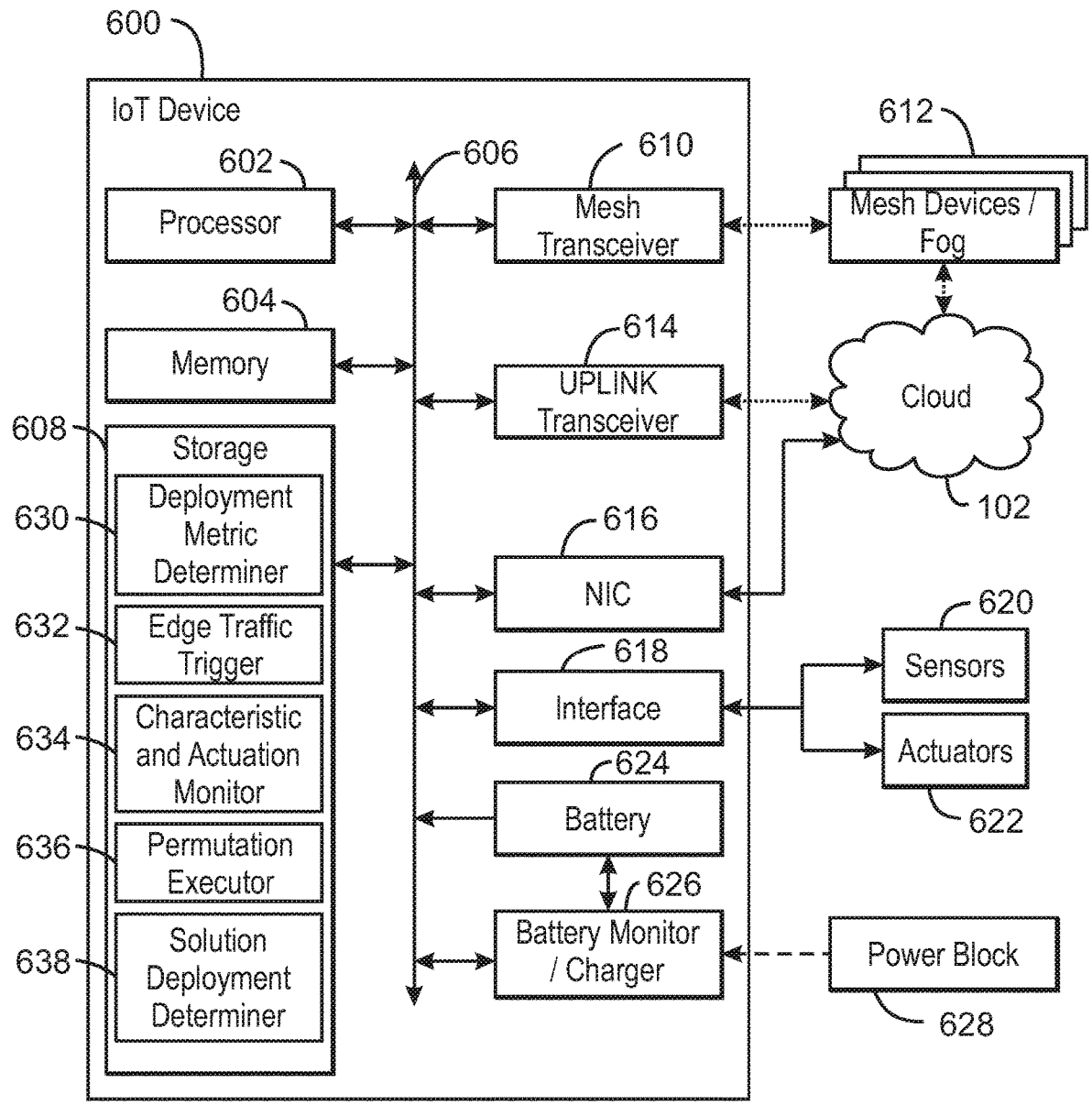
FIG. 6 is a block diagram of an example of components that may be present in an IoT device for offloading data in accordance with embodiments of the present techniques.

FIG. 6 is a block diagram of an example of components that may be present in an IoT device 600 for offloading data. The IoT device 600 may include any combinations of the components shown in the example. The components may be implemented as ICs, portions thereof, discrete electronic devices, or other modules, logic, hardware, software, firmware, or a combination thereof adapted in the IoT device 600, or as components otherwise incorporated within a chassis of a larger system. The block diagram of FIG. 6 is intended to show a high-level view of components of the IT device 600. However, some of the components shown may be omitted, additional components may be present, and different arrangements of the components shown may occur in other implementations.

The IoT device 600 may include a processor 602, which may be a microprocessor, a multi-core processor, a multi-threaded processor, an ultra-low voltage processor, an embedded processor, or other known processing element. The processor 602 may be a part of a system on a chip (SoC) in which the processor 602 and other components are formed into a single integrated circuit, or a single package, such as the Edison™ or Galileo™ SoC boards from Intel. As an example, the processor 602 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 602 may communicate with a system memory 604 over a bus 606. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 608 may also couple to the processor 602 via the bus 606. To enable a thinner and lighter system design the mass storage 608 may be implemented via a solid state disk drive (SSDD). Other devices that may be used for the mass storage 608 include flash memory cards, such as SD cards, microSD cards, xD picture cards, and the like, and USB flash drives. In low power implementations, the mass storage 608 may be on-die memory or registers associated with the processor 602. However, in some examples, the mass storage 608 may be implemented using a micro hard disk drive (HDD). Further, any number of new technologies may be used for the mass storage 608 in addition to, or instead of, the technologies described, such as resistance change memories, phase change memories, holographic memories, or chemical memories, among others. For example, the IoT device 600 may incorporate the 3D XPOINT memories from Intel® and Micron®.

The components may communicate over the bus 606. The bus 606 may include any number of technologies, including industry standard architecture (ISA), extended ISA (EISA), peripheral component interconnect (PCI), peripheral component interconnect extended (PCIx), PCI express (PCIe), or any number of other technologies. The bus 606 may be a proprietary bus, for example, used in a SoC based system. Other bus systems may be included, such as an $I^2C$ interface, an SPI interface, point to point interfaces, and a power bus, among others.

The bus 606 may couple the processor 602 to a mesh transceiver 610, for communications with other mesh devices 612. The mesh transceiver 610 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 612. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 610 may communicate using multiple standards or radios for communications at different ranges. For example, the IoT device 600 may communicate with close devices, e.g., within about 10 meters, using a local transceiver based on BLE, or another low power radio, to save power. More distant mesh devices 612, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 610 may be incorporated into an MCU as an address directly accessible by the chip, such as in the Curie® units available from Intel.

An uplink transceiver 614 may be included to communicate with devices in the cloud 102. The uplink transceiver 614 may be LPWA transceiver that follows the IEEE 802.15.4, or IEEE 802.15.4g standards, among others. The IoT device 600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in IEEE 802.15.4e may be used.

Any number of other radio communications and protocols may be used in addition to the systems mentioned for the mesh transceiver 610 and uplink transceiver 614, as described herein. For example, the radio transceivers 610 and 614 may include an LTE or other cellular transceiver that uses spread spectrum (SPA/SAS) communications for implementing high speed communications, such as for video transfers. Further, any number of other protocols may be used, such as Wi-Fi networks for medium speed communications, such as still pictures, sensor readings, and provision of network communications.

The radio transceivers 610 and 614 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 614, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 616 may be included to provide a wired communication to the cloud 102. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 616 may be included to allow connection to a second network, for example, a NIC 616 providing communications to the cloud over Ethernet, and a second NIC 616 providing communications to other devices over another type of network.

The bus 606 may couple the processor 602 to an interface 618 that is used to connect external devices. The external devices may include sensors 620, such as accelerometers, level sensors, flow sensors, temperature sensors, pressure sensors, barometric pressure sensors, and the like. The interface 618 may be used to connect the IoT device 600 to actuators 622, such as power switches, valve actuators, an audible sound generator, a visual warning device, and the like.

While not shown, various input/output (I/O) devices may be present within, or connected to, the IoT device 600. For example, a display may be included to show information, such as sensor readings or actuator position. An input device, such as a touch screen or keypad may be included to accept input.

A battery 624 may power the IoT device 600, although in examples in which the IoT device 600 is mounted in a fixed location, it may have a power supply coupled to an electrical grid. The battery 624 may be a lithium ion battery, a metal-air battery, such as a zinc-air battery, an aluminum-air battery, a lithium-air battery, and the like.

A battery monitor/charger 626 may be included in the IoT device 600 to track the state of charge (SoCh) of the battery 624. The battery monitor/charger 626 may be used to monitor other parameters of the battery 624 to provide failure predictions, such as the state of health (SoH) and the state of function (SoF) of the battery 624. The battery monitor/charger 626 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 626 may communicate the information on the battery 624 to the processor 602 over the bus 606. The battery monitor/charger 626 may also include an analog-to-digital (ADC) convertor that allows the processor 602 to directly monitor the voltage of the battery 624 or the current flow from the battery 624. The battery parameters may be used to determine actions that the IoT device 600 may perform, such as transmission frequency, mesh network operation, sensing frequency, and the like.

A power block 628, or other power supply coupled to a grid, may be coupled with the battery monitor/charger 626 to charge the battery 624. In some examples, the power block 628 may be replaced with a wireless power receiver to obtain the power wirelessly, for example, through a loop antenna in the IoT device 600. A wireless battery charging circuit, such as an LTC4020 chip from Linear Technologies of Milpitas, Calif., among others, may be included in the battery monitor/charger 626. The specific charging circuits chosen depend on the size of the battery 624, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 608 may include a number of modules to implement the IoT solution sizing functions described herein. Although shown as code blocks in the mass storage 608, it may be understood that any of the modules may be replaced with hardwired circuits, for example, built into an application specific integrated circuit (ASIC). The mass storage 608 may include a deployment metric determiner 630 and an edge traffic trigger 632. A characteristic and actuation monitor 634 may be included. A code block is included for a permutation executor 636. A code block is also included for a solution deployment determiner 638. This code executed by a processor may be stored and executed by devices other than the IoT device 600.

Figure 7:
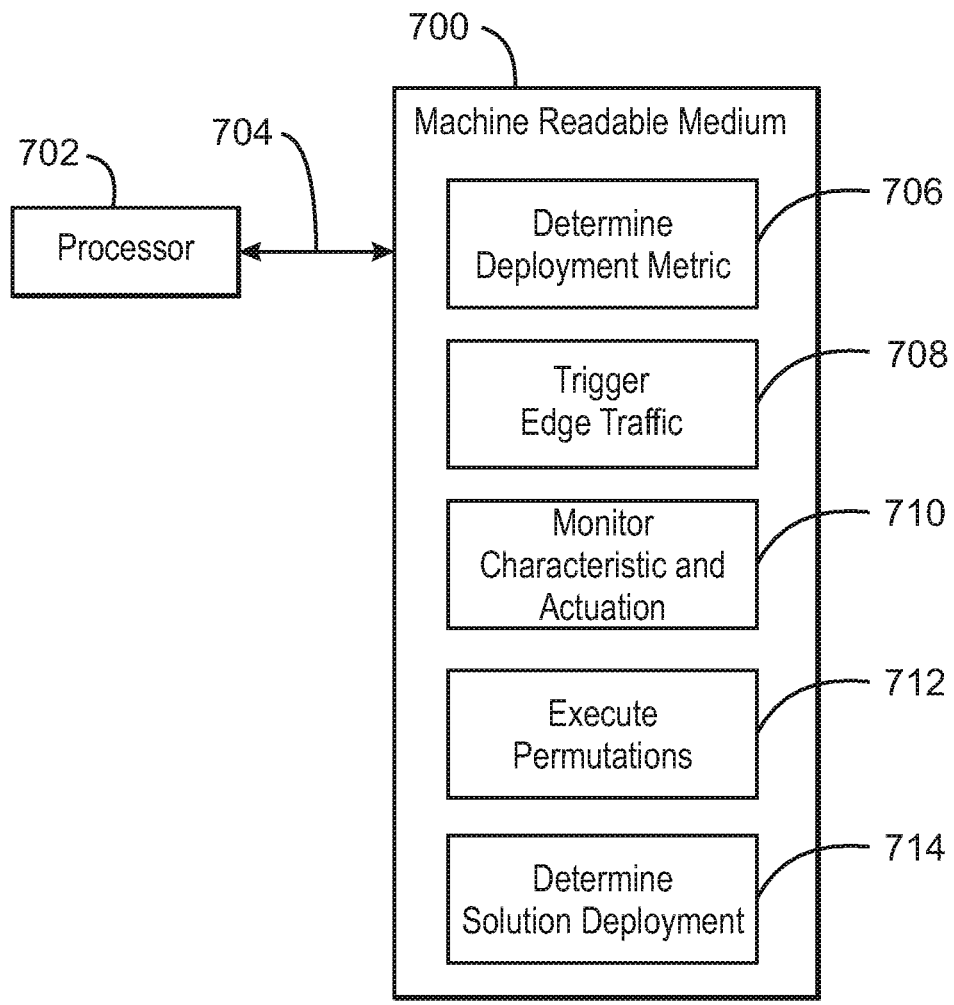
FIG. 7 is a non-transitory machine readable medium in accordance with embodiments of the present techniques.

FIG. 7 is a block diagram of a non-transitory, machine readable medium 700 including code to direct a processor 702 to implement techniques described herein such as to improve or optimize IoT solution sizing. The processor 702 may access the non-transitory, machine readable medium 700 over a bus 704. The processor 702 and bus 704 may be as described with respect to FIG. 6. The non-transitory, machine readable medium 700 may include devices described for the mass storage 608 of FIG. 6 or may include optical disks, thumb drives, or any number of other hardware devices.

The non-transitory, machine-readable medium 700 may include code 706 to direct the processor 702 to determine an improved or optimal solution deployment metric by evaluating the characteristic impact of a plurality of input workflows. Code 708 may be included to direct the processor 702 to trigger edge traffic, as discussed. Code 710 may be included to direct the processor 702 to monitor a round trip characteristic and an actuation pattern from the sensors to the end devices. Code 712 may be included to direct the processor 702 to execute permutations of input workloads by using a plurality of trigger scripts housed in the automation framework. Code 714 may be included to direct the processor 702 to determine a beneficial or optimal solution deployment, as discussed.

Lastly, as indicated, the IoT systems discussed herein may have a hybrid architecture of real and simulated components. Thus, embodiments may include a hybrid of live and simulated/emulated systems. This hybrid set-up may accommodate evaluation of, for instance, system capacity and fault recovery scenarios. Moreover, an evaluation of a proposed expansion of an IoT architecture may involve simulations with respect to already-installed or existing devices outside of the IoT system which the IoT system will incorporate or tie into, as well as new IoT devices to be installed, and so on.

Examples are provided. Example 1 is an apparatus. The apparatus includes a processor; and memory storing code executable by the processor to: determine a solution deployment metric in the IoT system; trigger edge traffic in the IoT system; monitor a round trip characteristic and an actuation pattern; execute permutations of input workloads; and determine a solution deployment.

Example 2 includes the apparatus of example 1, including or excluding optional features. In this example, the IoT system comprises a hybrid architecture comprising live and simulated components.

Example 3 includes the apparatus of any one of examples 1 to 2, including or excluding optional features. In this example, the solution deployment metric comprises at least one of percent central processing unit (CPU), percent memory, link quality, signal level, or time-to-transmit.

Example 4 includes the apparatus of any one of examples 1 to 3, including or excluding optional features. In this example, the computing device to trigger edge traffic comprises a control user interface (UI) to send a traffic start notification and a configuration parameter to sensors or sensor simulators of the IoT system, the configuration parameter comprising at least one of publish frequency, quality of service (QoS) value, or payload size.

Example 5 includes the apparatus of any one of examples 1 to 4, including or excluding optional features. In this example, the computing device to monitor a round trip characteristic and an actuation pattern comprises the computing device to initiate latency measurements, and wherein the permutations comprise combinations that constitute workload configurations comprising publish frequency, standard packet size, and a communication protocol.

Example 6 includes the apparatus of any one of examples 1 to 5, including or excluding optional features. In this example, the solution deployment determined comprises a parameter value that satisfies a solution characteristic threshold.

Example 7 includes the apparatus of any one of examples 1 to 6, including or excluding optional features. In this example, the apparatus includes a control user interface (UI) to access configuration parameters and control devices of the IoT system. Optionally, the control UI is to initiate monitoring daemons in devices controlled by the control UI and analyze root cause failures. Optionally, the configuration parameters comprise at least one of number of sensors, sensor publish frequencies, packet sizes, burstiness of traffic profiles, or quality of service values of Message Queuing Telemetry Transport (MQTT) based transmissions.

Example 8 includes the apparatus of any one of examples 1 to 7, including or excluding optional features. In this example, the apparatus includes an automation framework housing a plurality of trigger scripts, wherein the permutations of input workloads are executed by the plurality of trigger scripts; and a control user interface (UI) comprising an iteration generator, wherein a user is to choose, via the iteration generator, configuration values for a plurality of input parameters. Optionally, the apparatus includes a database accessed via the control UI, wherein data mapped in a tuple in the database comprises at least one of workflow configuration information, observed system performance, or resulting solution characteristics, and wherein the iteration generator builds permutations of a stated input value and triggers a series of sequential automation runs.

Example 9 is a method, by a computing device, for solution sizing for an Internet of Things (IoT) system. The method includes determining a solution deployment metric for the IoT system; triggering edge traffic in the IoT system; monitoring a round trip characteristic and an actuation pattern; executing permutations of input workloads; and determining a solution deployment.

Example 10 includes the method of example 9, including or excluding optional features. In this example, the IoT system comprises a hybrid architecture comprising live and simulated components.

Example 11 includes the method of any one of examples 9 to 10, including or excluding optional features. In this example, the method includes accessing a database via a control user interface (UI) and mapping data in a tuple in the database, wherein the solution deployment metric comprises at least one of percent central processing unit (CPU), percent memory, link quality, signal level, or time-to-transmit.

Example 12 includes the method of any one of examples 9 to 11, including or excluding optional features. In this example, triggering edge traffic comprises sending, via a control user interface (UI), traffic start notifications and a configuration parameter to sensors or sensor simulators of the IoT system, the configuration parameter comprising at least one of publish frequency, quality of service (QoS) value, or payload size.

Example 13 includes the method of any one of examples 9 to 12, including or excluding optional features. In this example, monitoring comprises latency measurements, and wherein determining a solution deployment comprises identifying the solution deployment as comprising a parameter value that satisfies a solution characteristic threshold.

Example 14 includes the method of any one of examples 9 to 13, including or excluding optional features. In this example, the method includes accessing a configuration parameter; controlling, via a control user interface (UI), devices of the IoT system, wherein the devices comprise a sensor and a gateway, wherein configuration parameters for the sensor comprise a publish characteristic, payload, and quality of service (QoS) value, wherein configuration parameters for the gateway comprise an on-device filter and notification alarm threshold; and initiating monitoring daemons in devices controlled by the control UI.

Example 15 includes the method of any one of examples 9 to 14, including or excluding optional features. In this example, the method includes choosing configuration values for a plurality of input parameters via an iteration generator; building permutations of a stated input value and triggering a series of sequential automation runs via the iteration generator; and analyzing root cause failures.

Example 16 includes the method of any one of examples 9 to 15, including or excluding optional features. In this example, the method includes interacting with defined trigger scripts via application program interfaces; building a function to determine an expected outcome for a stated set of input parameters; and extrapolating a solution characteristic and system performance for a range of incrementing workload parameters.

Example 17 is a tangible, non-transitory, computer-readable medium. The computer-readable medium includes instructions that direct the processor to determine a solution deployment metric for an Internet of Things (IoT) system; trigger edge traffic; monitor a round trip characteristic and an actuation pattern; execute permutations of input workloads; and determine a solution deployment.

Example 18 includes the computer-readable medium of example 17, including or excluding optional features. In this example, the IoT system comprises a hybrid architecture comprising live and simulated components.

Example 19 includes the computer-readable medium of any one of examples 17 to 18, including or excluding optional features. In this example, the computer-readable medium includes code executable by a processor to direct the processor to: access a configuration parameter; control devices of the IoT system via a control user interface (UI); initiate control UI monitoring daemons in devices controlled by the control UI; and analyze root cause failures.

Example 20 includes the computer-readable medium of any one of examples 17 to 19, including or excluding optional features. In this example, the computer-readable medium includes code executable by a processor to direct the processor to build permutations of a stated input value and trigger a series of sequential automation runs.

Example 21 includes the computer-readable medium of any one of examples 17 to 20, including or excluding optional features. In this example, the computer-readable medium includes code executable by a processor to build a function and extrapolate a solution characteristic and system performance for a range of incrementing workload parameters.

Example 22 includes the computer-readable medium of any one of examples 17 to 21, including or excluding optional features. In this example, the solution deployment metric comprises at least one of percent central processing unit (CPU), percent memory, link quality, signal level, or time-to-transmit.

Example 23 is a system of Internet of Things (IoT) solution sizing. The system includes means for determining a solution deployment metric; means for triggering edge traffic; means for monitoring a round trip characteristic and an actuation pattern; means for executing permutations of input workloads; and means for determining a solution deployment.

Example 24 includes the system of example 23, including or excluding optional features. In this example, the system includes means for accessing a configuration parameter.

Example 25 includes the system of any one of examples 23 to 24, including or excluding optional features. In this example, the system includes means for initiating monitoring daemons in devices controlled by a control UI.

Example 26 includes the system of any one of examples 23 to 25, including or excluding optional features. In this example, the system includes means for controlling elements of the IoT system. Optionally, the elements comprise a sensor and a gateway. Optionally, configuration parameters for the sensor comprise a publish characteristic, payload, and quality of service (QoS) value. Optionally, configuration parameters for the gateway comprise an on-device filter and notification alarm threshold.

Example 27 includes the system of any one of examples 23 to 26, including or excluding optional features. In this example, the system includes means for analyzing root cause failures.

Example 28 includes the system of any one of examples 23 to 27, including or excluding optional features. In this example, the system includes means for choosing configuration values for a plurality of input parameters.

Example 29 includes the system of any one of examples 23 to 28, including or excluding optional features. In this example, the system includes means for building permutations of a stated input value and triggering a series of sequential automation runs.

Example 30 includes the system of any one of examples 23 to 29, including or excluding optional features. In this example, the system includes means for accessing a database, and means for mapping data in a tuple in the database.

Example 31 includes the system of any one of examples 23 to 30, including or excluding optional features. In this example, the solution deployment metric comprises percent central processing unit (CPU), percent memory, link quality, signal level, or time-to-transmit.

Example 32 includes the system of any one of examples 23 to 31, including or excluding optional features. In this example, the system includes means for interacting with defined trigger scripts.

Example 33 includes the system of any one of examples 23 to 32, including or excluding optional features. In this example, the system includes means for building a function to determine an expected outcome for a stated set of input parameters.

Example 34 includes the system of any one of examples 23 to 33, including or excluding optional features. In this example, the system includes means for extrapolating a solution characteristic and system performance for a range of incrementing workload parameters.

Example 35 is an apparatus. The apparatus includes a processor; memory storing code executable by the processor to: determine a solution deployment metric; trigger edge traffic; monitor a round trip characteristic and an actuation pattern; execute permutations of input workloads; and determine a solution deployment; and provide a control user interface (UI) to: access configuration parameters; initiate monitoring daemons in devices controlled by the control UI; control elements of the IoT system; and analyze root cause failures.

Example 36 includes the apparatus of example 35, including or excluding optional features. In this example, the configuration parameters comprise number of sensors, sensor publish frequencies, packet sizes, burstiness of traffic profiles, and quality of service values of Message Queuing Telemetry Transport (MQTT) based transmissions.

Example 37 includes the apparatus of any one of examples 35 to 36, including or excluding optional features. In this example, the control UI comprises an iteration generator. Optionally, a user is to choose, via the iteration generator, configuration values for a plurality of input parameters. Optionally, the iteration generator builds permutations of a stated input value and triggers a series of sequential automation runs.

Example 38 includes the apparatus of any one of examples 35 to 37, including or excluding optional features. In this example, the apparatus includes a database accessed via the control UI. Optionally, data mapped in a tuple in the database comprises workflow configuration information, observed system performance, and resulting solution characteristics.

Example 39 includes the apparatus of any one of examples 35 to 38, including or excluding optional features. In this example, the apparatus includes an automation framework housing a plurality of trigger scripts.

Example 40 is a method of Internet of Things (IoT) solution sizing. The method includes determining a solution deployment metric, wherein the solution deployment metric comprises percent central processing unit (CPU), percent memory, link quality, signal level, or time-to-transmit; triggering edge traffic; monitoring a round trip characteristic and an actuation pattern; executing permutations of input workloads; determining a solution deployment; and choosing configuration values for a plurality of input parameters via an iteration generator.

Example 41 includes the method of example 40, including or excluding optional features. In this example, the method includes accessing a configuration parameter.

Example 42 includes the method of any one of examples 40 to 41, including or excluding optional features. In this example, the method includes initiating monitoring daemons of a control user interface (UI) in devices controlled by the control UI.

Example 43 includes the method of any one of examples 40 to 42, including or excluding optional features. In this example, the method includes controlling elements of the IoT system. Optionally, the elements comprise a sensor and a gateway. Optionally, configuration parameters for the sensor comprise a publish characteristic, payload, and quality of service (QoS) value. Optionally, configuration parameters for the gateway comprise an on-device filter and notification alarm threshold.

Example 44 includes the method of any one of examples 40 to 43, including or excluding optional features. In this example, the method includes analyzing root cause failures.

Example 45 includes the method of any one of examples 40 to 44, including or excluding optional features. In this example, the method includes building permutations of a stated input value and triggering a series of sequential automation runs via the iteration generator, and further comprising accessing a database via the control UI and mapping data in a tuple in the database.

Example 46 includes the method of any one of examples 40 to 45, including or excluding optional features. In this example, the method includes interacting with defined trigger scripts via application program interfaces.

Example 47 includes the method of any one of examples 40 to 46, including or excluding optional features. In this example, the method includes building a function to determine an expected outcome for a stated set of input parameters.

Example 48 includes the method of any one of examples 40 to 47, including or excluding optional features. In this example, the method includes extrapolating a solution characteristic and system performance for a range of incrementing workload parameters.

Example 49 is a tangible, non-transitory, computer-readable medium. The computer-readable medium includes instructions that direct the processor to determine a solution deployment metric for an Internet of Things (IoT) system; trigger edge traffic; monitor a round trip characteristic and an actuation pattern; execute permutations of input workloads; determine a solution deployment; and access a configuration parameter.

Example 50 includes the computer-readable medium of example 49, including or excluding optional features. In this example, the computer-readable medium includes code executable by a processor to direct the processor to initiate a control user interface (UI) monitoring daemons in devices controlled by the control UI.

Example 51 includes the computer-readable medium of any one of examples 49 to 50, including or excluding optional features. In this example, the computer-readable medium includes code executable by a processor to direct the processor to control devices of the IoT system.

Example 52 includes the computer-readable medium of any one of examples 49 to 51, including or excluding optional features. In this example, the computer-readable medium includes code executable by a processor to direct the processor to analyze root cause failures.

Example 53 includes the computer-readable medium of any one of examples 49 to 52, including or excluding optional features. In this example, the computer-readable medium includes code executable by a processor to direct the processor to build permutations of a stated input value and trigger a series of sequential automation runs.

Example 54 includes the computer-readable medium of any one of examples 49 to 53, including or excluding optional features. In this example, the computer-readable medium includes code executable by a processor to build a function and extrapolate a solution characteristic and system performance for a range of incrementing workload parameters.

Example 55 is a computing device for Internet of Things (IoT) solution sizing. The computing device to determine a solution deployment metric; trigger edge traffic; monitor a round trip characteristic and an actuation pattern; execute permutations of input workloads; and determine a solution deployment.

Example 56 includes the computing device of example 55, including or excluding optional features. In this example, the computing device includes a control user interface (UI) to access configuration parameters, initiate monitoring daemons in devices controlled by the control UI, control elements of the IoT system, and analyze root cause failures. Optionally, the configuration parameters comprise number of sensors, sensor publish frequencies, packet sizes, burstiness of traffic profiles, and quality of service values of Message Queuing Telemetry Transport (MQTT) based transmissions. Optionally, the control UI comprises an iteration generator, wherein a user is to choose, via the iteration generator, configuration values for a plurality of input parameters. Optionally, the iteration generator builds permutations of a stated input value and triggers a series of sequential automation runs. Optionally, the computing device includes a database accessed via the control UI. Optionally, data mapped in a tuple in the database comprises workflow configuration information, observed system performance, and resulting solution characteristics.

Example 57 includes the computing device of any one of examples 55 to 56, including or excluding optional features. In this example, the computing device includes an automation framework housing a plurality of trigger scripts.

Example 58 is a system of Internet of Things (IoT) solution sizing. The system includes means for determining a solution deployment metric; means for triggering edge traffic; means for monitoring a round trip characteristic and an actuation pattern; means for executing permutations of input workloads; means for determining a solution deployment; and means for accessing a configuration parameter.

Example 59 includes the system of example 58, including or excluding optional features. In this example, the system includes means for initiating monitoring daemons in devices controlled by a control UI.

Example 60 includes the system of any one of examples 58 to 59, including or excluding optional features. In this example, the system includes means for controlling elements of the IoT system. Optionally, the elements comprise a sensor and a gateway. Optionally, configuration parameters for the sensor comprise a publish characteristic, payload, and quality of service (QoS) value. Optionally, configuration parameters for the gateway comprise an on-device filter and notification alarm threshold.

Example 61 includes the system of any one of examples 58 to 60, including or excluding optional features. In this example, the system includes means for analyzing root cause failures.

Example 62 includes the system of any one of examples 58 to 61, including or excluding optional features. In this example, the system includes means for choosing configuration values for a plurality of input parameters.

Example 63 includes the system of any one of examples 58 to 62, including or excluding optional features. In this example, the system includes means for building permutations of a stated input value and triggering a series of sequential automation runs.

Example 64 includes the system of any one of examples 58 to 63, including or excluding optional features. In this example, the system includes means for accessing a database, and means for mapping data in a tuple in the database.

Example 65 includes the system of any one of examples 58 to 64, including or excluding optional features. In this example, the solution deployment metric comprises percent central processing unit (CPU), percent memory, link quality, signal level, or time-to-transmit.

Example 66 includes the system of any one of examples 58 to 65, including or excluding optional features. In this example, the system includes means for interacting with defined trigger scripts.

Example 67 includes the system of any one of examples 58 to 66, including or excluding optional features. In this example, the system includes means for building a function to determine an expected outcome for a stated set of input parameters.

Example 68 includes the system of any one of examples 58 to 67, including or excluding optional features. In this example, the system includes means for extrapolating a solution characteristic and system performance for a range of incrementing workload parameters.

Example 69 is a computing device for Internet of Things (IoT). The computing device to determine a solution deployment metric; trigger edge traffic; monitor a round trip characteristic and an actuation pattern; execute permutations of input workloads; and determine a solution deployment; and wherein the computing device comprises a control user interface (UI) to: access configuration parameters; initiate monitoring daemons in devices controlled by the control UI; control elements of the IoT system; and analyze root cause failures.

Example 70 includes the computing device of example 69, including or excluding optional features. In this example, the configuration parameters comprise number of sensors, sensor publish frequencies, packet sizes, burstiness of traffic profiles, and quality of service values of Message Queuing Telemetry Transport (MQTT) based transmissions.

Example 71 includes the computing device of any one of examples 69 to 70, including or excluding optional features. In this example, the control UI comprises an iteration generator. Optionally, a user is to choose, via the iteration generator, configuration values for a plurality of input parameters. Optionally, the iteration generator builds permutations of a stated input value and triggers a series of sequential automation runs.

Example 72 includes the computing device of any one of examples 69 to 71, including or excluding optional features. In this example, the computing device includes a database accessed via the control UI. Optionally, data mapped in a tuple in the database comprises workflow configuration information, observed system performance, and resulting solution characteristics.

Example 73 includes the computing device of any one of examples 69 to 72, including or excluding optional features. In this example, the computing device includes an automation framework housing a plurality of trigger scripts.

Example 74 is a system of Internet of Things (IoT) solution sizing. The system includes means for determining a solution deployment metric, wherein the solution deployment metric comprises percent central processing unit (CPU), percent memory, link quality, signal level, or time-to-transmit; means for triggering edge traffic; means for monitoring a round trip characteristic and an actuation pattern; means for executing permutations of input workloads; means for determining a solution deployment; and means for choosing configuration values for a plurality of input parameters.

Example 75 includes the system of example 74, including or excluding optional features. In this example, the system includes means for accessing a configuration parameter; means for initiating monitoring daemons of a control user interface (UI) in devices controlled by the control UI; means for controlling elements of the IoT system, wherein the elements comprise a sensor and a gateway, wherein configuration parameters for the sensor comprise a publish characteristic, payload, and quality of service (QoS) value, and wherein configuration parameters for the gateway comprise an on-device filter and notification alarm threshold; and means for analyzing root cause failures.

Example 76 includes the system of any one of examples 74 to 75, including or excluding optional features. In this example, the system includes means for comprising building permutations of a stated input value and triggering a series of sequential automation runs, and further comprising means for accessing a database and mapping data in a tuple in the database.

Example 77 includes the system of any one of examples 74 to 76, including or excluding optional features. In this example, the system includes means for interacting with defined trigger scripts.

Example 78 includes the system of any one of examples 74 to 77, including or excluding optional features. In this example, the system includes means for building a function to determine an expected outcome for a stated set of input parameters; and means for extrapolating a solution characteristic and system performance for a range of incrementing workload parameters.

Examples of Code

The following are only examples and not intended to limit the present techniques. There may be multiple files which run on a device according to the role of the device (client, gateway, or server). The following code is from an example profiler script which triggers execution. In this example, the code reads a configuration file, splits the configuration file into module configuration files, enables or disables CPU cores, and sets the frequency for each core as required. The code also triggers execution of individual modules and writes latencies for each module.

```
def trigger_executor( ):
    """ Create individual module config files, trigger core and frequency
    configuration"""
    global req
    try:
        split_config(req)
        phy_cores=open("/sys/devices/system/cpu/present","rU").
readline( ).rstrip("\n").split("")[1]
        core = int(phy_cores)+1
        disable_core(core)
        freq_new =freq( ) #reading frequency config
            commands = open(PROFILER_DIR+"commands","rU").
            read( ).splitlines( )
            inputs = [freq_new,0,commands]
            set_config(inputs,core)
            write_to_file( )
            print True
    except Exception as err:
        print False
```

The following example code provides for Modbus execution. The code creates connections to Modbus clients and reads data from Modbus sensors and publishes the data to a server. Modbus may generally be a communication protocol for coupling industrial electronic devices. Modbus is a serial communication protocol developed by Modicon® and published by Modicon® in 1979 for use with programmable logic controllers (PLCs) and other devices. The Modbus technique may provide for transmitting information over serial lines between electronic devices in some examples.

```
def connect(client_ip):
    """ Create connection to modbus clients """
    global latencies
    client = ModbusTcpClient(client_ip)
    stat = client.connect( )
```

-continued

```
if stat:
    avg_let = 0.0
    count = 0
    while count <int(timer): # read values for specified sec
        count += 1
        latency = read_data(client)
```

-continued

```
        mqttc.disconnect( )
    return latency
```

The following example code provides for video module execution. The code creates connections to video clients and starts the video clients.

```
Gateway:
def start_ffserver( ):
    """ Start ffserver before starting video clients. """
    p = subprocess.Popen("/usr/local/bin/ffserver -f/etc/ffserver.conf", \
            shell=True, stdout = subprocess.PIPE, stderr=subprocess.PIPE)
    pid = subprocess.check_output('pidof ffserver', shell=True)
    return pid
def client_handler(ip, passwd, gw_ip, feed, q):
    """ Create connection to video clients(RaspberryPi) """
    ssh = paramiko.SSHClient( )
    ssh.set_missing_host_key_policy(paramiko.AutoAddPolicy( ))
    ssh.connect(ip, username="pi", password='raspberry')
    cmd = "python " + str(BASE_DIR) + "client/video/fire_ffmpeg.py " + str(gw_ip) + " " +
str(feed)
    s1, s2, s3 = ssh.exec_command(cmd)
    q.put(s2.read( )) # put the ffmpeg execution time received from client into a queue.
    q.task_done( )
def server_handler(ip, passwd, gw_ip, n_clients, ssh_q):
    """ Start media player and subscribes to the stream from ffserver. """
    ssh = paramiko.SSHClient( )
    ssh_q.put(ssh) #put the ssh object in global queue to stop media players.
    ssh_q.task_done( )
    ssh.set_missing_host_key_policy(paramiko.AutoAddPolicy( ))
    ssh.connect(ip, username="afour", password=passwd)
    stream = n_clients
    for n in range(n_clients):
        cmd = "python " + str(BASE_DIR) + "server/video/fire_player.py " + str(gw_ip) + " " +
str(stream)
        s1, s2, s3 = ssh.exec_command(cmd)
        s2.read( )
        stream = stream 1
Client :
def fire_ffmpeg( ):
    """ Start video client """
    gw_ip = str(sys.argv[1]) #gateway ip(1st interface)
    feed = int(sys.argv[2]) # feed for ffmpeg.
    command = "/home/pi/bin/ffmpeg -i/home/afour/idlf/client/video/240p.flv -strict
experimental http://" + str(gw_ip) + ":8090/" + "feed" + str(feed) + ".ffm"
    start = time.time( )
    p = subprocess.Popen(command, shell = True, stdout = subprocess.PIPE,
stderr = subprocess.PIPE)
    p.wait( )
    end = time.time( )
    print endstart
```

-continued

```
        avg_let = avg_let + ((latency-avg_let)/count)
        time.sleep(1)
        latencies.append(avg_let)
    else:
        print "\n Could not connect client ", str(client)
def read_data(client):
    """ Read data from modbus sensors and publish to server. """
    global MOTT_BROKER, MOTT_PORT
    tid = threading.current_thread( )
    latency = None
    t1 = time.time( )
    sensor1 = client.read_input_registers(0x00, 10,unit=1)
    t2 = time.time( )
    latency = (t2 - t1)
    curr = sensor1.registers[0]
    payload = {"id":str(client.host)+":"+str(client.port), "stime" : t1,
"curr":curr}
    mqttc = mqtt.Client("", True, None, mqtt.MQTTv31)
    mqttc.connect(host= MQTT_BROKER, port= MQTT_PORT)
    mqttc.publish(TOPIC, json.dumps(payload))
```

The following example code provides for Zigbee module execution. The code configures a receiver on a gateway, creates an MQTT client for publishing data to a server, starts a server script for receiving MQTT data forwarded by the gateway, and triggers Zigbee clients. The code also checks if a Zigbee device is connected to a port and configures serial ports for sending data through Zigbee clients.

```
Gateway:
def configure_serial_port( ):
    """ Configure receiver on gateway """
    return (serial.Serial( port='/dev/ttyUSB0', baudrate = 9600, \
            parity=serial.PARITY_NONE, \
            stopbits=serial.STOPBITS_TWO, \
            bytesize=serial.EIGHTBITS, timeout=1))
def configre_mqtt(server_ip):
    """ Create mqtt client for publishing data to server """
    mqtt_obj = mqtt.Client( )
    mqtt_obj.connect(host=server_ip, port=1887)
    return mqtt_obj
```

```
def fire_zigbee_server(ip, passwd, n_clients):
    """ Start server script for receiving mqtt data forwarded by
gateway. """
    ssh = paramiko.SSHClient( )
    ssh.set_missing_host_key_policy(paramiko.AutoAddPolicy( ))
    ssh.connect(ip, username="root", password=passwd)
    cmd = "python " + str(BASE_DIR) + "server/zigbee/zigbee_server.
py " + str(n_clients) + " " + str(n_clients * TIMER)
    s1, s2, s3 = ssh.exec_command(cmd)
    s2.read( )
def client_handler(client_dict, n_clients):
    """ Trigger zigbee clients """
    ssh = paramiko.SSHClient( )
    ssh.set_missing_host_key_policy(paramiko.AutoAddPolicy( ))
    ssh.connect(client_dict['ip'], username="root",
         password=client_dict['password'])
    arg = ' '.join(client_dict['port'])
    cmd = "python " + BASE_DIR + "client/zigbee/zigbee_client.py " +
str(n_clients * TIMER) + " " + arg
    s1, s2, s3 = ssh.exec_command(cmd)
```

```
    serial_ports = proc.communicate( )[0].split( )[:-2]
    for p in usb_ports:
        if p not in serial_ports:
            print >> sys.stderr, "requested USB port is not available"
            return False
def connect_port(usb_ports):
    """ Configure serial ports for sending data through xbee clients """
    port_connc_dict = { }
    for port in usb_ports:
        serial_obj = serial.Serial(port=port, baudrate = 9600, \
            parity=serial.PARITY_NONE, \
            stopbits=serial.STOPBITS_TWO, \
            bytesize=serial.EIGHTBITS, timeout=1)
        port_connc_dict[port] = serial_obj
    return port_connc_dict
```

The following example code is concerned with CPU monitoring and utilization. The code reads CPU utilization and monitors and calculates CPU utilization while processes are executing.

```
def get_total_cpu_util( ):
    """ Read CPU utilization """
    with open('/proc/stat') as t_cpu:
        tc_line = t_cpu.readline( ).split( )
        tot_util = int(tc_line[1])+int(tc_line[2])+int(tc_line[3])+int(tc_line[6])+int(tc_line[7])
        tot_cpu = tot_util+(int(tc_line[4])+int(tc_line[5]))
        t_cpu.close( )
        return [int(tot_cpu), int(tot_util)]
def top(p_id):
    """ Monitor and Calculate CPU utilization while the processes are executed """
    tot_mem = subprocess.check_output("cat /proc/meminfo | grep MemTotal | awk {'print
$2'}",shell=True)
    avg_cpu = 0
    avg_util = 0
    min_cpu = 100
    max_cpu = 0
    mem = 0
    count = 0
    interval = 1
    proc_id = int(p_id)
    prev_proc = int(get_util(proc_id))
    [prev_total, prev_util] = get_total_cpu_util( )
    while(1):
        count +=1
        time.sleep(float(interval))
        curr_mem = subprocess.check_output("cat /proc/"+str(p_id)+"/status | grep VmRSS
| awk {'print $2'}",shell=True)
        curr_proc = int(get_util(proc_id))
        [curr_total, curr_util] = get_total_cpu_util( )
        if (prev_proc == 1 or curr_proc == -1):
            break
        pcpu_util = (curr_proc - prev_proc)*100/float(curr_total - prev_total)
        tcpu_util = (curr_util - prev_util)*100/float(curr_total - prev_total)
        min_cpu = pcpu_util if pcpu_util < min_cpu else min_cpu
        max_cpu = pcpu_util if pcpu_util > max_cpu else max_cpu
        avg_cpu = avg_cpu + ((pcpu_util - avg_cpu)/count)
        avg_util = avg_util + ((tcpu_util - avg_util)/count)
        mem = 0.0
        [prev_total, prev_util] = [curr_total, curr_util]
        used_mem = int(subprocess.check_output("free -k | grep Mem | awk {'print $3'}",
shell=True))
        used_mem_percent = float(used_mem)*100/float(tot_mem)
    return min_cpu, max_cpu, avg_cpu, avg_util, mem, used_mem_percent
```

```
    s2.read( )
Client:
def check_port(usb_ports):
    """ Check if xbee device is connected to the port """
    proc = subprocess.Popen("python -m serial.tools.list_ports", \
        stdout = subprocess.PIPE, shell = True)
```

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the method or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus comprising a computing device for solution sizing in an Internet of Things (IoT) system, comprising: a processor;
   memory storing code executable by the processor to:
   determine a solution deployment metric in the IoT system; trigger edge traffic in the IoT system; monitor a round trip characteristic and an actuation pattern; build permutations of a stated input value;
   trigger a series of sequential automation runs to execute the permutations; and
      determine a solution deployment;
      an automation framework housing a plurality of trigger scripts, wherein the
      permutations are executed by the plurality of trigger scripts; and a control user interface (UI) comprising an iteration generator, wherein a user is to
      choose, via the iteration generator, configuration values for a plurality of
      input parameters.

2. The apparatus of claim 1, wherein the IoT system comprises a hybrid architecture comprising live and simulated components.

3. The apparatus of claim 1, wherein the solution deployment metric comprises at least one of percent central processing unit (CPU), percent memory, link quality, signal level, or time-to-transmit.

4. The apparatus of claim 1, wherein the computing device to trigger edge traffic comprises the control user interface (UI) to send a traffic start notification and a configuration parameter to sensors or sensor simulators of the IoT system, the configuration parameter comprising at least one of publish frequency, quality of service (QoS) value, or payload size.

5. The apparatus of claim 1, wherein the computing device to monitor a round trip characteristic and an actuation pattern comprises the computing device to initiate latency measurements, and wherein the permutations comprise combinations that constitute workload configurations comprising publish frequency, standard packet size, and a communication protocol.

6. The apparatus of claim 1, wherein the solution deployment determined comprises a parameter value that satisfies a solution characteristic threshold.

7. The apparatus of claim 1, the control user interface (UI) to access configuration parameters and control devices of the IoT system.

8. The apparatus of claim 7, wherein the control UI to initiate monitoring daemons in devices controlled by the control UI and analyze root cause failures.

9. The apparatus of claim 8, wherein the configuration parameters comprise at least one of number of sensors, sensor publish frequencies, packet sizes, burstiness of traffic profiles, or quality of service values of Message Queuing Telemetry Transport (MQTT) based transmissions.

10. The apparatus of claim 1, comprising a database accessed via the control UI, wherein data mapped in a tuple in the database comprises at least one of workflow configuration information, observed system performance, or resulting solution characteristics, and wherein the iteration generator builds permutations of a stated input value and triggers a series of sequential automation runs.

11. The apparatus of claim 1, the memory storing code executable by the processor to:
   access a configuration parameter;
   control, via the control user interface (UI), devices of the IoT system, wherein the devices comprise a sensor and a gateway, wherein configuration parameters for the sensor comprise a publish characteristic, payload, and quality of service (QoS) value, wherein configuration parameters for the gateway comprise an on-device filter and notification alarm threshold; and initiate monitoring daemons in devices controlled by the control UI.

12. The apparatus of claim 1, the memory storing code executable by the processor to:
choose configuration values for a plurality of input parameters via the iteration generator;
build the permutations of a stated input value and trigger the series of sequential automation runs via the iteration generator; and
analyze root cause failures.

13. The apparatus of claim 1, the memory storing code executable by the processor to:
interact with defined trigger scripts via application program interfaces;
build a function to determine an expected outcome for a stated set of input parameters; and
extrapolate a solution characteristic and system performance for a range of incrementing workload parameters.

14. A method, by a computing device, for solution sizing for an Internet of Things (IoT) system, comprising:
determining a solution deployment metric for the IoT system;
triggering edge traffic in the IoT system;
monitoring a round trip characteristic and an actuation pattern;
building permutations of a stated input value;
triggering a series of sequential automation runs to execute the permutations, wherein the permutations are executed by a plurality of trigger scripts housed in an automation framework;
allowing a user to choose, via an iteration generator of a control user interface (UI), configuration values for a plurality of input parameters; and
determining a solution deployment.

15. The method of claim 14, wherein the IoT system comprises a hybrid architecture comprising live and simulated components.

16. The method of claim 14, comprising accessing a database via the control user interface (UI) and mapping data in a tuple in the database, wherein the solution deployment metric comprises at least one of percent central processing unit (CPU), percent memory, link quality, signal level, or time-to-transmit.

17. The method of claim 14, wherein triggering edge traffic comprises sending, via the control user interface (UI), traffic start notifications and a configuration parameter to sensors or sensor simulators of the IoT system, the configuration parameter comprising at least one of publish frequency, quality of service (QoS) value, or payload size.

18. The method of claim 14, wherein monitoring comprises latency measurements, and wherein determining a solution deployment comprises identifying the solution deployment as comprising a parameter value that satisfies a solution characteristic threshold.

19. The method of claim 14, comprising:
accessing a configuration parameter;
controlling, via the control user interface (UI), devices of the IoT system, wherein the devices comprise a sensor and a gateway, wherein configuration parameters for the sensor comprise a publish characteristic, payload, and quality of service (QoS) value, wherein configuration parameters for the gateway comprise an on-device filter and notification alarm threshold; and
initiating monitoring daemons in devices controlled by the control UI.

20. The method of claim 14, comprising:
choosing configuration values for a plurality of input parameters via the iteration generator;
building the permutations of a stated input value and triggering the series of sequential automation runs via the iteration generator; and
analyzing root cause failures.

21. The method of claim 14, comprising:
interacting with defined trigger scripts via application program interfaces;
building a function to determine an expected outcome for a stated set of input parameters; and
extrapolating a solution characteristic and system performance for a range of incrementing workload parameters.

22. A tangible, non-transitory, computer-readable medium comprising code executable by a processor to direct the processor to:
determine a solution deployment metric for an Internet of Things (IoT) system;
trigger edge traffic in the IoT system;
monitor a round trip characteristic and an actuation pattern;
build permutations of a stated input value;
trigger a series of sequential automation runs to execute the permutations, wherein the permutations are executed by a plurality of trigger scripts housed in an automation framework;
allow a user to choose, via an iteration generator of a control user interface (UI), configuration values for a plurality of input parameters; and
determine a solution deployment.

23. The tangible, non-transitory, computer-readable medium of claim 22, wherein the IoT system comprises a hybrid architecture comprising live and simulated components.

24. The tangible, non-transitory, computer-readable medium of claim 22, comprising code executable by a processor to direct the processor to:
access a configuration parameter;
control devices of the IoT system via the control user interface (UI);
initiate control UI monitoring daemons in devices controlled by the control UI; and
analyze root cause failures.

25. The tangible, non-transitory, computer-readable medium of claim 22, comprising code executable by a processor to direct the processor to build permutations of a stated input value and trigger a series of sequential automation runs.

26. The tangible, non-transitory, computer-readable medium of claim 22, comprising code executable by a processor to build a function and extrapolate a solution characteristic and system performance for a range of incrementing workload parameters.

27. The tangible, non-transitory, computer-readable medium of claim 22, wherein the solution deployment metric comprises at least one of percent central processing unit (CPU), percent memory, link quality, signal level, or time-to-transmit.

28. The tangible, non-transitory, computer-readable medium of claim 22, comprising code executable by a processor to:

access a configuration parameter;

control, via the control user interface (UI), devices of the IoT system, wherein the devices comprise a sensor and a gateway, wherein configuration parameters for the sensor comprise a publish characteristic, payload, and quality of service (QoS) value, wherein configuration parameters for the gateway comprise an on-device filter and notification alarm threshold; and initiate monitoring daemons in devices controlled by the control UI.

29. The tangible, non-transitory, computer-readable medium of claim 22, comprising code executable by a processor to:

choose configuration values for a plurality of input parameters via the iteration generator;

build the permutations of a stated input value and trigger the series of sequential automation runs via the iteration generator; and analyze root cause failures.

30. The tangible, non-transitory, computer-readable medium of claim 22, comprising code executable by a processor to:

interact with defined trigger scripts via application program interfaces;

build a function to determine an expected outcome for a stated set of input parameters; and extrapolate a solution characteristic and system performance for a range of incrementing workload parameters.

* * * * *